(12) United States Patent
Yoshida et al.

(10) Patent No.: US 9,461,453 B2
(45) Date of Patent: Oct. 4, 2016

(54) TERMINAL FITTING (71) Applicant: YAZAKI CORPORATION, Tokyo (JP)

(72) Inventors: Haruki Yoshida, Kakegawa (JP); Yoshitaka Tsushima, Fujieda (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/440,956

(22) PCT Filed: Nov. 12, 2013

(86) PCT No.: PCT/JP2013/080590
§ 371 (c)(1),
(2) Date: May 6, 2015

(87) PCT Pub. No.: WO2014/073705
PCT Pub. Date: May 15, 2014

(65) Prior Publication Data
US 2015/0303674 A1     Oct. 22, 2015

(30) Foreign Application Priority Data
Nov. 12, 2012   (JP) .................................. 2012-248874

(51) Int. Cl.
*H01R 4/64*   (2006.01)
*H02G 15/02*  (2006.01)
(Continued)

(52) U.S. Cl.
CPC ................ *H02G 15/02* (2013.01); *H01R 4/26* (2013.01); *H01R 4/58* (2013.01); *H01R 11/12* (2013.01); *H02G 3/32* (2013.01)

(58) Field of Classification Search
CPC ............................... H01R 4/186; H01R 11/12
USPC ........................................ 174/84 C; 439/345
See application file for complete search history.

(56) References Cited

U.S. PATENT DOCUMENTS 8,794,990 B2 *   8/2014   Deno .................... H01R 4/646
                                                    439/345
9,306,299 B2 *   4/2016   Yoshida ................ H01R 11/12
(Continued)

FOREIGN PATENT DOCUMENTS

CN     102414871 A    4/2012
JP    2003-197344 A   7/2003
(Continued)

OTHER PUBLICATIONS

Written Opinion dated Feb. 18, 2014, issued by the International Searching Authority in counterpart International Application No. PCT/JP2013/080590.
Search Report dated Feb. 18, 2014, issued by the International Searching Authority in counterpart International Application No. PCT/JP2013/080590.
(Continued)

*Primary Examiner* — Chau N Nguyen
(74) *Attorney, Agent, or Firm* — Sughrue Mion, PLLC (57) ABSTRACT

Provided is a terminal fitting that includes a first terminal fitting having a first electric wire holding section for holding an electric wire, a first attachment section to be attached to an attachment target object, and a protruding section provided on the first attachment section, and a second terminal fitting piece having a second electric wire holding section for holding an electric wire, a second attachment section to be attached to the attachment target object, and a hole section provided in the second attachment section, the first attachment section and the second attachment section being overlapped with each other in a state that the protruding section is inserted into the hole section.

7 Claims, 8 Drawing Sheets

(51) Int. Cl.
  *H01R 4/26* (2006.01)
  *H01R 4/58* (2006.01)
  *H01R 11/12* (2006.01)
  *H02G 3/32* (2006.01)

(56) References Cited

U.S. PATENT DOCUMENTS

| | | | |
|---|---|---|---|
| 2004/0023542 A1* | 2/2004 | Maeda | H01R 11/12 439/287 |
| 2004/0040734 A1* | 3/2004 | Fujii | H01R 11/32 174/84 C |
| 2012/0015550 A1 | 1/2012 | Ikeda et al. | |
| 2013/0122731 A1 | 5/2013 | Deno et al. | |

FOREIGN PATENT DOCUMENTS

| | | |
|---|---|---|
| JP | 2004-327355 A | 11/2004 |
| JP | 2005-032557 A | 2/2005 |
| JP | 2012-029512 A | 2/2012 |
| WO | 2012/014687 A1 | 2/2012 |

OTHER PUBLICATIONS

Communication issued Jun. 1, 2016, issued by the State Intellectual Property Office of the People's Republic of China in counterpart Chinese Patent Application No. 201380058794.0.

Communication issued Jun. 7, 2016, issued by the Japanese Patent Office in counterpart Japanese Patent Application No. 2012-248874.

* cited by examiner

TERMINAL FITTING

TECHNICAL FIELD

The present invention relates to a terminal fitting, and more particularly to a terminal fitting for attaching an electric wire or the like to an attachment target object.

BACKGROUND ART

Figure 5:
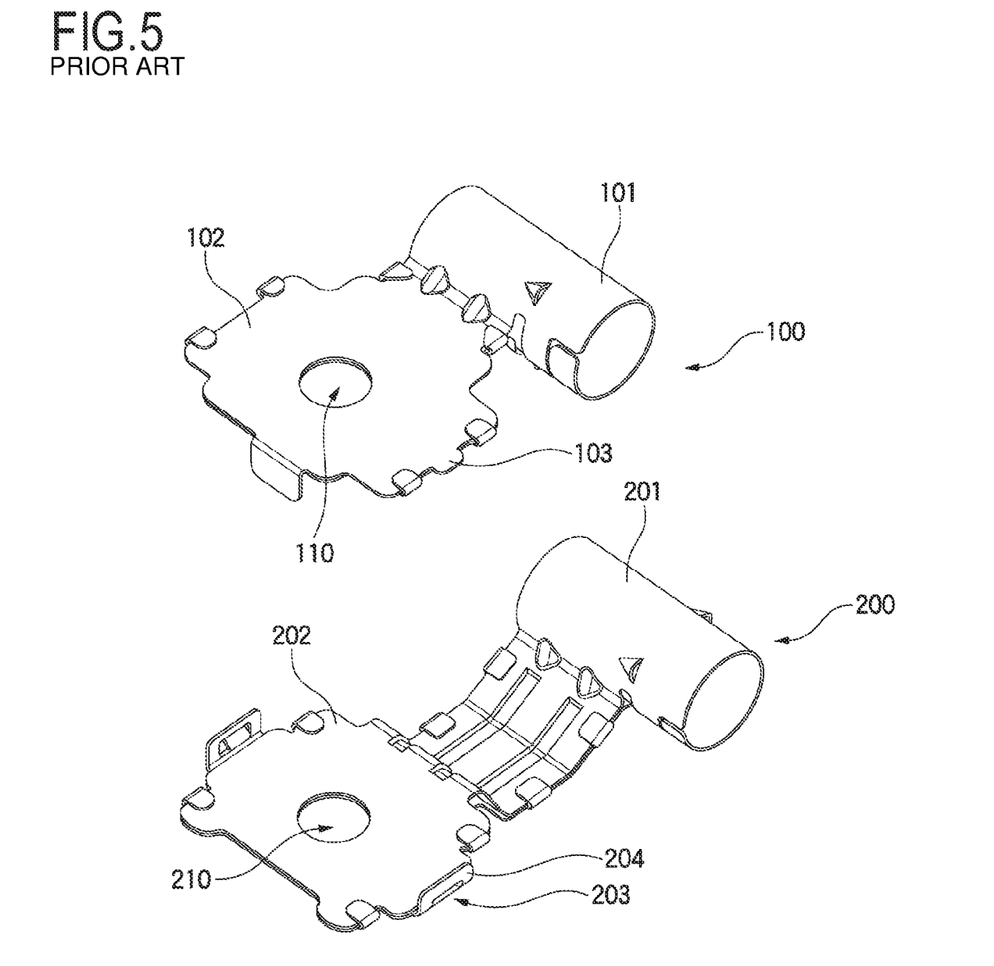
FIG. 5 is a view illustrating a state in which the pair of conventional terminal fitting pieces are separated from each other.
Figure 6:
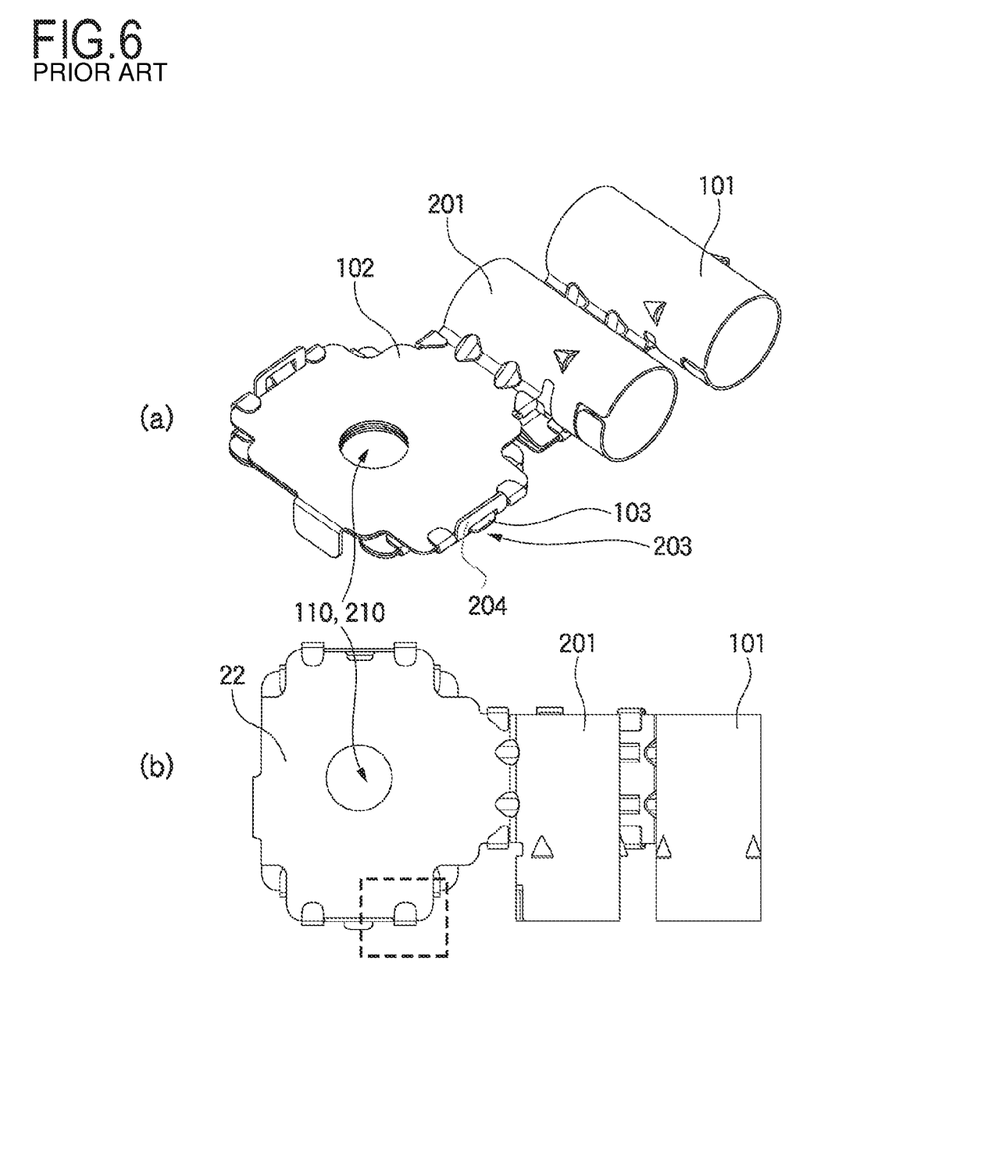
FIGS. 6(a) and 6(b) are views illustrating a state in which the pair of conventional terminal fitting pieces are overlapped with each other.

Shielded electric wires are sometimes routed around a car body. The braid of each of these shielded electric wires is electrically connected to the car body, which serves as an earth. Hence, there is a need to provide a terminal fitting for connecting the shielded electric wire to the car body (refer to Patent Document 1). FIG. 5 is a view illustrating a state in which a pair of conventional terminal fitting pieces 100 and 200 are separated from each other. FIGS. 6(a) and 6(b) are views illustrating a state in which the pair of conventional terminal fitting pieces 100 and 200 are overlapped with each other. The conventional terminal fitting illustrated in FIGS. 5 and 6(a) and 6(b) includes the pair of terminal fitting pieces 100 and 200. The pair of terminal fitting pieces 100 and 200 are respectively formed by punching and bending sheet metal and include cylindrical electric wire holding sections 101 and 201 for holding electric wires and attachment sections 102 and 202 to be attached to an attachment target object, such as a car body, respectively.

Each of the cylindrical electric wire holding sections 101 and 201 are adapted to hold a shielded electric wire inside the cylinder thereof. The conductive section of the shielded electric wire to be held is exposed and electrically connected to each of the electric wire holding sections 101 and 201. For example, the conductive section of the shielded electric wire is passed through the inside of the cylinder and the cylinder is caulked in the radial direction of the cylinder, so that the braid of the shielded electric wire is electrically connected to each of the electric wire holding sections 101 and 201.

Each of the attachment sections 102 and 202 is formed into a flat plate shape, and a connection section is formed at the outer edge thereof. The connection section is formed of either a protruding section 103 or a hole section 203 in each of the pair of terminal fitting pieces 100 and 200. The hole section 203 is provided in the side face of a wall section 204.

When the protruding section 103 of the terminal fitting piece 100, i.e., one of the terminal fitting pieces, is inserted into the hole section 203 of the other terminal fitting piece 200, the overlapped state of the pair of terminal fitting pieces 100 and 200 is maintained. The attachment sections 102 and 202 include through holes 110 and 210 through which a bolt for attaching the terminal fitting pieces 100 and 200 to the attachment target object passes. In a state in which the pair of terminal fitting pieces 100 and 200 is overlapped with each other using the connection sections (the protruding section 103 and the hole section 203), when the bolt having passed through the through holes 110 and 210 is screwed (tightened) into a weld nut provided on the car body, the pair of terminal fitting pieces 100 and 200 is attached to the attachment target object such as the car body.

PRIOR ART DOCUMENT

Patent Document

Patent Document 1: JP-A-2012-29512

SUMMARY OF INVENTION

Problem that the Invention is to Solve

Figure 7:
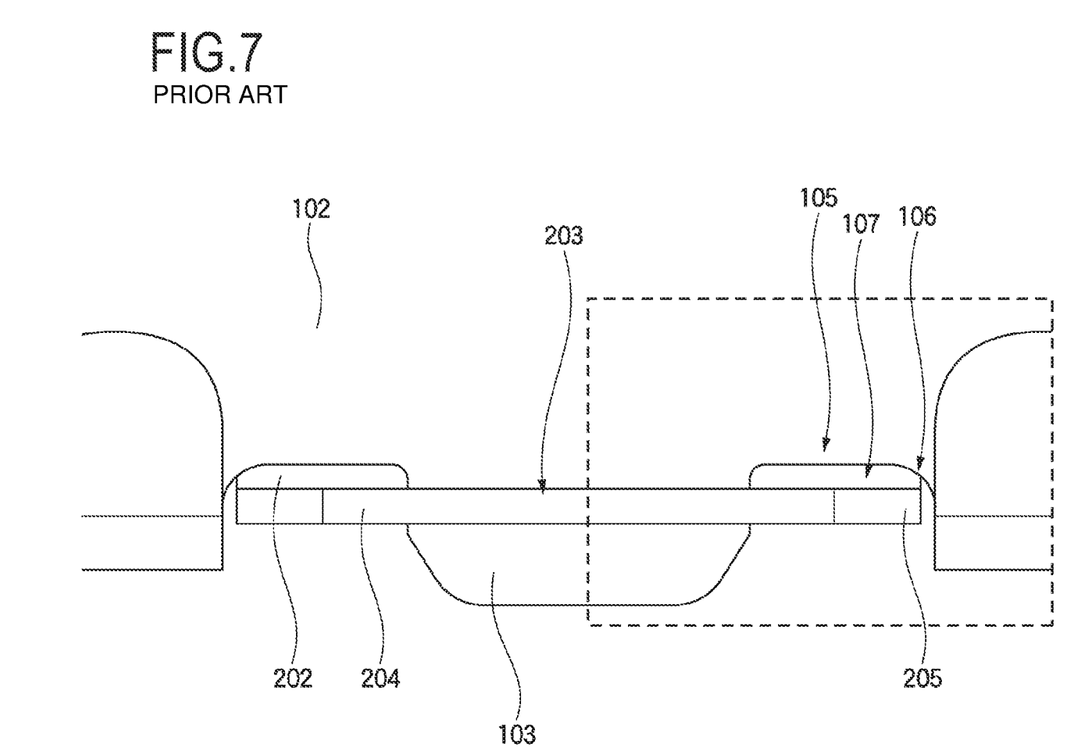
FIG. 7 is a top view illustrating the terminal fitting pieces in which the range indicated in broken lines in FIG. 6 is enlarged.

The overlapped state of the pair of conventional terminal fitting pieces 100 and 200 is maintained by the connection sections (the protruding section 103 and the hole section 203. FIG. 6(b) is a top view illustrating the overlapped state of the terminal fitting pieces 100 and 200. FIG. 7 is a top view illustrating the terminal fitting pieces in which the range indicated in broken lines in FIG. 6(b) is enlarged. As illustrated in FIG. 7, the protruding section 103 of the terminal fitting piece 100 is inserted into the hole section 203 of the terminal fitting piece 200, so that the terminal fitting pieces 100 and 200 are overlapped with each other while the protruding section 103 and the hole section 203 are engaged with each other. When the protruding section 103 of the terminal fitting piece 100 is inserted into the hole section 203 provided in the side face of the wall section 204, the widthwise end section 205 of the wall section 204 is brought into point-contact with a rounded section (rounded surface section) 106 serving as the end section of a concave section 105 (a recessed section located on each of both sides of the protruding section 103) formed in the attachment section 102. By virtue of this point contact, the terminal fitting piece 100 is placed in position with respect to the terminal fitting piece 200, and the terminal fitting pieces 100 and 200 are overlapped with each other.

In the structure, however, in which the terminal fitting piece 100 is placed in position with respect to the terminal fitting piece 200 by virtue of the point contact of the end section 205 of the wall section 204 with the rounded section (rounded surface section) 106, the position of the terminal fitting piece 100 with respect to the terminal fitting piece 200 is not stable. Hence, the terminal fitting pieces 100 and 200 overlapped with each other in this situation have a risk of lacking stability and strength. Furthermore, since the end section 205 of the wall section 204 is brought into point-contact with the rounded section (local surface section) 106, a wasteful space 107 is formed in the concave section 105.

Figure 8:
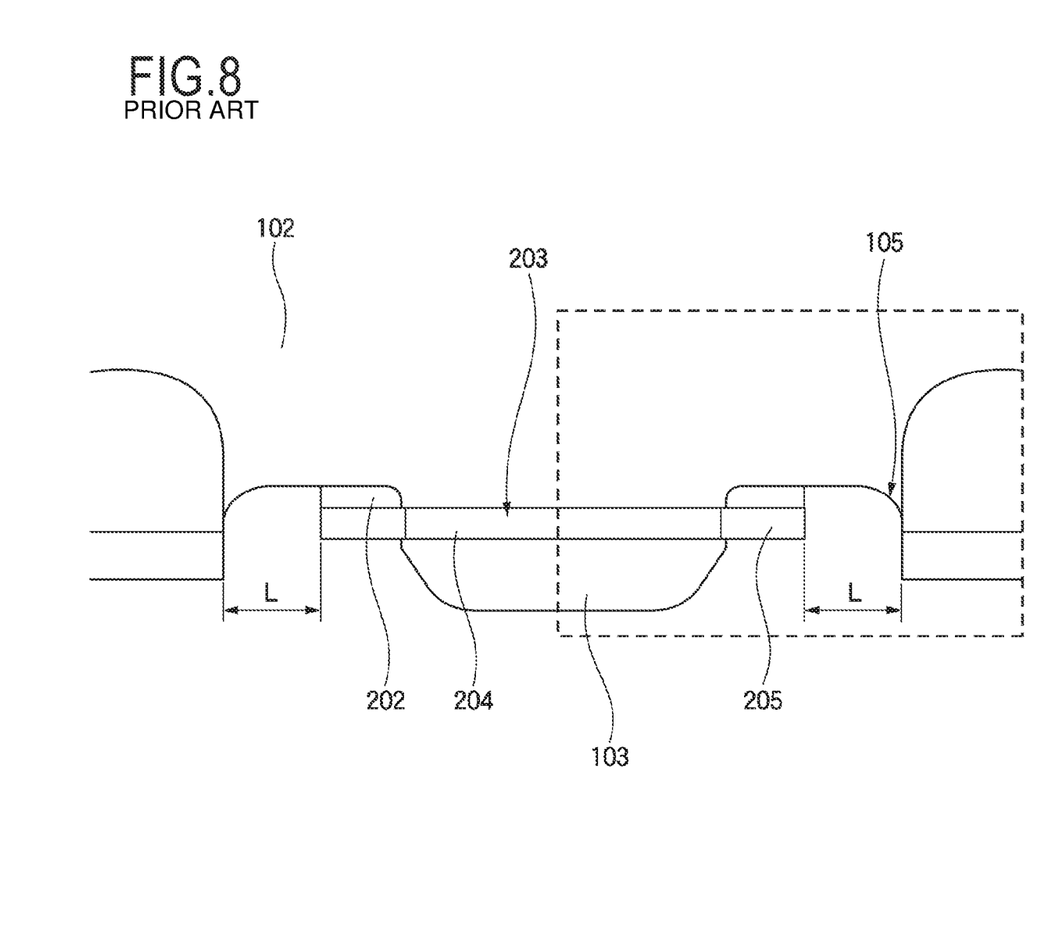
FIG. 8 is a view illustrating that if the length of the wall section is made shorter, a wasteful space occurs in the length direction of the wall section.

It may be contemplated that the widthwise length of the wall section 204 is shortened to avoid the end section 205 of the wall section 204 from making point contact with the rounded section (local surface section) 106; however, if the widthwise length of the wall section 204 is shortened as illustrated in FIG. 8, a wasteful space L occurs in the width direction of the wall section 204. Moreover, although the terminal fitting piece 100 has to be placed in position with respect to the terminal fitting piece 200 by only using the protruding section 103 and the hole section 203, the deviation amount of the protruding section 103 along the width direction of the wall section 204 is apt to become large due to the dimensional deviation between the protruding section 103 and the hole section 203. For this reason, the position of the terminal fitting piece 100 with respect to the terminal fitting piece 200 is not stable, and the protruding section 103 wobbles in the length direction of the wall section 204.

Accordingly, in view of the above-mentioned circumstances, an object of the present invention is to provide a terminal fitting configured such that the stability and strength of the terminal fitting pieces thereof overlapped with each other can be improved while forming of a wasteful space is suppressed.

Means for Solving the Problem

As an aspect of a terminal fitting according to the present invention, provided is a terminal fitting including: a first terminal fitting piece including a first electric wire holding section adapted to hold an electric wire, a first attachment section to be attached to an attachment target object, and a protruding section provided on the first attachment section; and a second terminal fitting piece including a second electric wire holding section adapted to hold an electric wire, a second attachment section to be attached to the attachment target object, and a hole section provided in the second attachment section; the first attachment section and the second attachment section being overlapped with each other in a state that the protruding section is inserted into the hole section. The first terminal fitting piece further includes a convex section extended from the first attachment section, and at least one of a side end face and a tip end face of the convex section is brought into face contact with a part of the second terminal fitting piece in a state that the first attachment section and the second attachment section are overlapped with each other.

With this configuration, the convex section is provided such that the contact face on which the first terminal fitting piece and the second terminal fitting piece are brought into face contact with each other is made larger, so that the position of the first terminal fitting piece with respect to the second terminal fitting piece becomes stable. Hence, the terminal fitting pieces overlapped with each other in this situation is improved in their stability and strength.

In a terminal fitting provided in accordance with another aspect of the present invention, the convex section includes a first convex section and a second convex section, and at least one of a side end face of the first convex section and a tip end face of the second convex section is brought into face contact with part of the second terminal fitting piece.

With this configuration, the first convex section and the second convex section are provided such that the contact face on which the first terminal fitting piece and the second terminal fitting piece are brought into face contact with each other is made larger, so that the position of the first terminal fitting piece with respect to the second terminal fitting piece becomes stable. Hence, the terminal fitting pieces overlapped with each other in this situation is improved in their stability and strength.

In the terminal fitting in accordance with another aspect of the present invention, the hole section is provided in a wall section standing upright from the second attachment section, and at least one of the side end face of the first convex section and the tip end face of the second convex section are brought into face contact with the wall section.

With this configuration, when the protruding section is inserted into the hole section provided in the wall section, the contact face on which the wall section makes face contact with the convex sections (the first convex section and the second convex section) is made larger, so that the position of the first terminal fitting piece with respect to the second terminal fitting piece becomes more stable. Hence, the terminal fitting pieces overlapped with each other in this situation is further improved in their stability and strength.

In the terminal fitting in accordance with another aspect of the present invention, the first convex section includes a first flat face section extending in a direction substantially perpendicular to a width direction of the wall section, the second convex section includes a second flat face section extending in a direction substantially parallel with the width direction of the wall section, and at least one of the first flat face section and the second flat section is brought into face contact with the wall section.

With this configuration, since the side end face (first flat face section) of the first convex section is made face contact with the wall section, the wobbling of the first terminal fitting piece with respect to the second terminal fitting piece is suppressed, so that the terminal fitting pieces overlapped with each other can be improved in stability and strength. Furthermore, since the wall section is made face contact with the tip end face (the second flat face section) of the second convex section, the terminal fitting pieces overlapped with each other can be improved in stability and strength, and even if the contact sections are made small by eliminating the wasteful space, sufficient stability and strength can be obtained.

In the terminal fitting provided in accordance with another aspect of the present invention, the first terminal fitting piece is configured by fixing a sheet metal piece including the protruding section and a sheet metal piece including the convex section to each other.

With this configuration, since the plurality of sheet metal pieces being different in shape are fixed, the protruding section, the first convex section and the second convex section can be readily formed on the first terminal fitting piece.

Advantageous Effects of Invention

The present invention can provide a terminal fitting configured such that the terminal fitting pieces thereof overlapped with each other are improved in their stability and strength.

MODE FOR CARRYING OUT THE INVENTION

Figure 1:
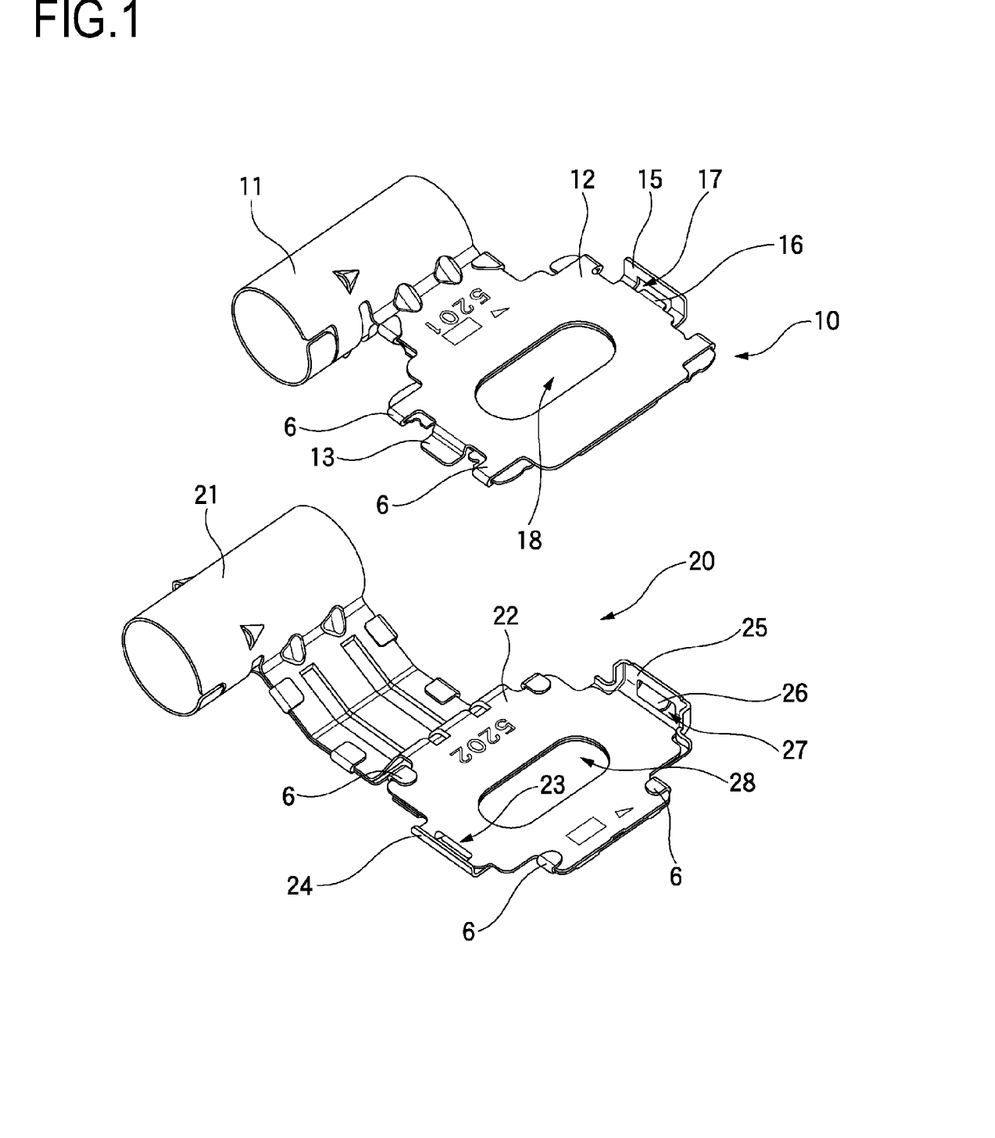
FIG. 1 is a perspective view illustrating a pair of terminal fitting pieces according to an embodiment.
Figure 2:
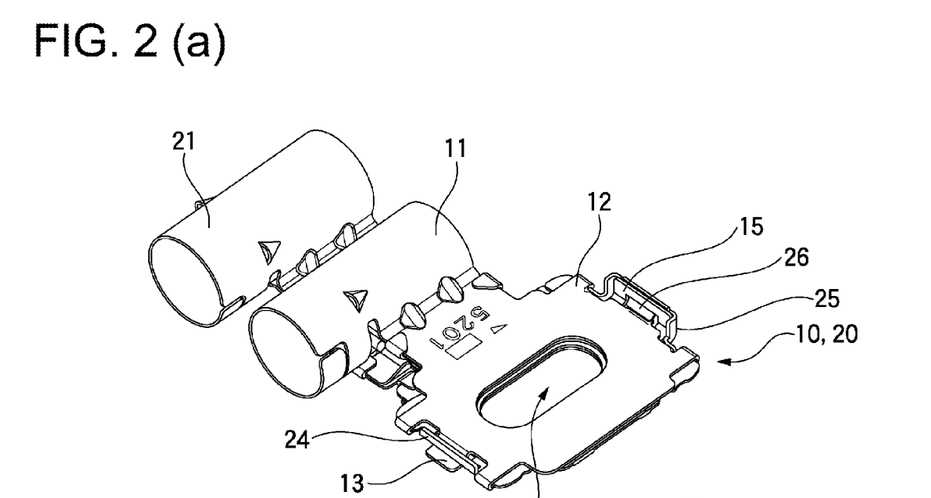
FIGS. 2(a) and 2(b) are views illustrating a state in which the pair of terminal fitting pieces according to this embodiment are overlapped with each other.

A terminal fitting according to an embodiment of the present invention will be described below with reference to FIGS. 1 to 4. FIG. 1 is a perspective view illustrating a pair of terminal fitting pieces according to this embodiment. FIG. 1 is a view illustrating a state in which the pair of terminal fitting pieces 10 and 20 are separated from each other. FIGS. 2(a) and 2(b) are views illustrating a state in which the pair of terminal fitting pieces 10 and 20 according to this embodiment are overlapped with each other.

As illustrated in FIG. 1, the pair of terminal fitting pieces 10 and 20 (the first terminal fitting piece 10 and the second terminal 1 fitting piece 20) are respectively formed by punching and bending sheet metal. The terminal fitting pieces 10 and 20 have electric wire holding sections 11 and 21 and attachment sections 12 and 22, respectively. The electric wire holding sections 11 and 21 are formed into a cylindrical shape, and shielded electric wires or the like are passed through the cylinders, and then the cylinders are caulked, thereby holding the electric wires. The conductive section of the shielded electric wire to be held is exposed and is electrically connected to each of the electric wire holding sections 11 and 21. For example, the conductive section of the shielded electric wire is passed through the inside of the cylinder and the cylinder is caulked in the radial direction of the cylinder, so that the braid of the shielded electric wire is electrically connected to each of the electric wire holding sections 11 and 21.

Each of the attachment sections 12 and 22 is configured such that caulking pieces 6 provided on one of two sheet metal pieces are bent toward the other sheet metal piece, thereby being fixed thereto. The attachment sections 12 and 22 are attached to an attachment target object, such as a car body. The attachment sections 12 and 22 are formed into a flat plate shape, and connection sections are formed at the outer edges thereof. The connection sections are portions where the attachment sections 12 and 22 are engaged with each other when they are overlapped with each other. Each connection section is formed by either a protruding section 13 or a hole section 23 on each of the pair of terminal fitting pieces 10 and 20. The hole section 23 is provided in a side face of the wall section 24 standing upright from the attachment section 22. More specifically, the wall section 24 is provided so as to stand upright from the lower sheet metal piece of the two sheet metal pieces constituting the attachment section 22, and the hole section 23 is formed in the wall section 24.

The protruding section 13 is extended from the upper sheet metal piece of the two sheet metal pieces constituting the attachment section 12. The protruding section 13 is provided with a step section, thereby being formed into a stepped shape as illustrated in FIG. 1. Meanwhile, the hole section 23 is provided on the side of the base end section of the wall section 24. The hole section 23 is formed so as to extend in nearly parallel with the direction of the widthwise length of the wall section 24. When the protruding section 13 of the one terminal fitting piece (first terminal fitting piece) 10 is inserted into the hole section 23 of the other terminal fitting piece (second terminal fitting piece) 20, the one terminal fitting piece 10 is placed in position with respect to the other terminal fitting piece 20, so that the pair of terminal fitting pieces 10 and 20 are overlapped with each other.

Locking sections are formed at the outer edges of attachment sections 12 and 22. The locking sections are brought into engagement with each other when the attachment sections 12 and 22 are overlapped with each other. The locking sections are formed by protruding sections 16 and 26 provided on the pair of terminal fitting pieces 10 and 20, respectively. The protruding section 16 extends outward from the lower sheet metal piece of the two sheet metal pieces constituting the attachment section 12. Furthermore, a wall section 15 is provided so as to stand upright from the lower sheet metal piece of the two sheet metal pieces constituting the attachment section 12. A hole section 17 is provided on the side of the base end section of the wall section 15.

Meanwhile, a wall section 25 is provided so as to stand upright from the lower sheet metal piece of the two sheet metal pieces constituting the attachment section 22. A hole section 27 is formed in this wall section 25, and the protruding section 26 is formed by bending part of the sheet metal located at the hole section 27 toward the inside of the attachment section 22. Hence, the protruding section 26 extends inward from the lower sheet metal piece of the two sheet metal pieces constituting the attachment section 22.

After the protruding section 13 of the terminal fitting piece 10 is inserted into the hole section 23 of the terminal fitting piece 20, the wall section 15 enters the wall section 25 while sliding along the inside thereof. Then, the protruding section 16 makes contact with the protruding section 26, and the protruding section 16 is inserted into the hole section 27 over the protruding section 26 by the elastic forces of the protruding section 16 and the protruding section 26, so that the protruding section 26 is inserted into the hole section 17. Hence, the protruding section 16 and the protruding section 26 are locked to each other. As a result, the overlapped state of the pair of terminal fitting pieces 10 and 20 is maintained.

The attachment sections 12 and 22 include through holes 18 and 28 through which a bolt for attaching the terminal fitting pieces 10 and 20 to the attachment target object passes. The through holes 18 and 28 are provided so as to pass through the two sheet metal pieces for forming the attachment sections 12 and 22 in the thickness direction thereof. Under the situation in which the state of the pair of terminal fitting pieces 10 and 20 being overlapped with each other using the connection sections (the protruding section 13 and the hole section 23) and the locking sections (the protruding sections 16 and 26) is maintained, when the bolt having passed through the through holes 18 and 28 is screwed (tightened) into a weld nut provided on the car body, the pair of terminal fitting pieces 10 and 20 are attached to the attachment target object, such as the car body.

The connection sections (the protruding section 13 and the hole section 23) and the locking sections (the protruding sections 16 and 26) are provided at the outer edges of the attachment sections 12 and 22 located in the electric wire insertion direction of the electric wire holding sections 11 and 21. More specifically, the connection sections (the protruding section 13 and the hole section 23) and the locking sections (the protruding sections 16 and 26) are provided between the caulking pieces 6 provided at the four corners of the attachment sections 12 and 22.

Figure 3:
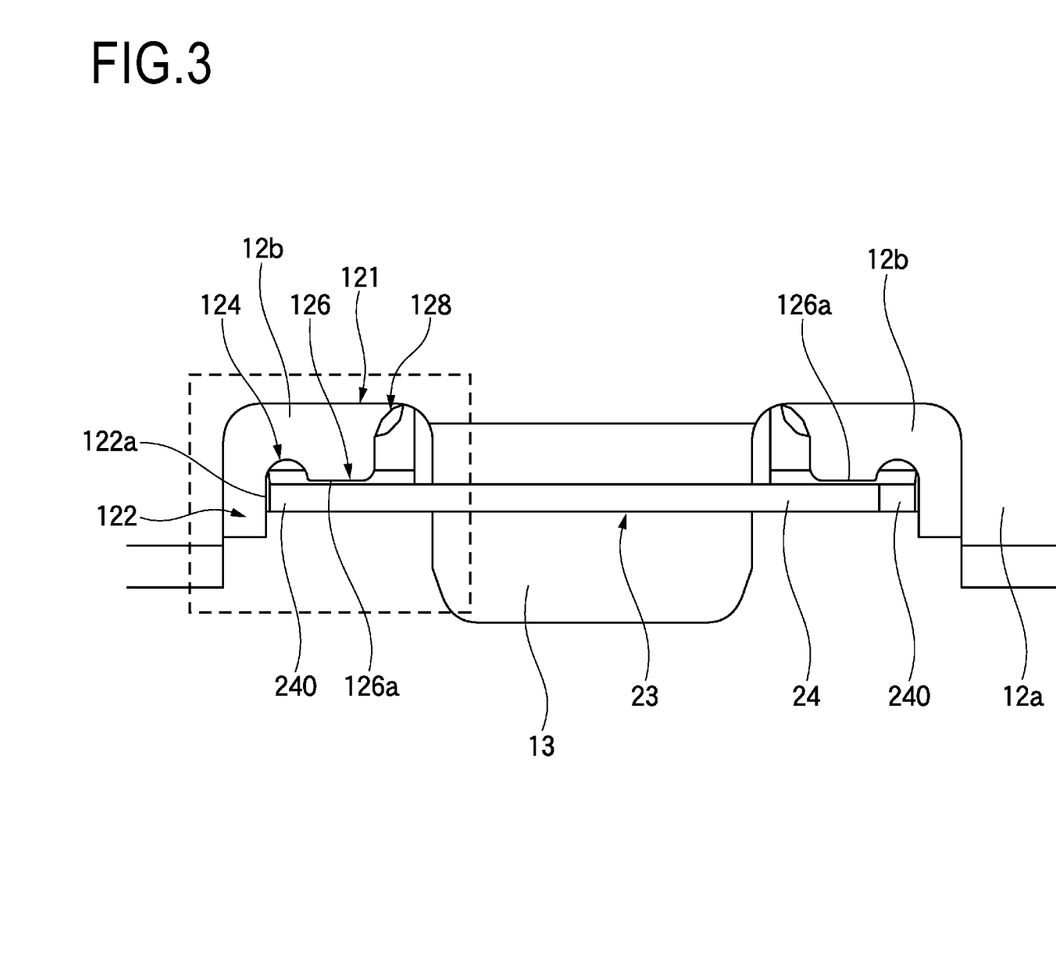
FIG. 3 is a top view illustrating the terminal fitting pieces in which the range indicated in broken lines in FIG. 2 is enlarged.

FIG. 2(b) is a top view illustrating the overlapped state of the terminal fitting pieces 10 and 20. FIG. 3 is a top view illustrating the terminal fitting pieces in which the range indicated in broken lines in FIG. 2(b) is enlarged. As illustrated in FIG. 3, the two sheet metal pieces 12a and 12b of the attachment section 12 of the terminal fitting piece 10 are fixed using the caulking pieces 6. The sheet metal piece 12a is provided with the protruding section 13. Part of the sheet metal piece 12b is exposed from the concave section 121 of the sheet metal piece 12a, that is, from the space formed between the protruding section 13 and the caulking piece 6. The part of the sheet metal piece 12b exposed from the concave section 121 is provided with a first convex section 122, a first concave section 124, a second convex section 126 and a second concave section 128.

The first convex section 122 is extended in the same direction as the protruding section 13 and is provided so as to continue to the sheet metal piece 12b at a portion adjacent to the caulking piece 6. The side end face of the first convex section 122 on the side close to the protruding section 13 is formed into a flat shape. In addition, the first concave section 124 is located between the first convex section 122 and the second convex section 126 and is formed so as to be recessed in the direction of withdrawing from the wall section 24. Furthermore, the second convex section 126 is located between the first concave section 124 and the second concave section 128 and is extended in the same direction as the protruding section 13. The tip end face of the second convex section 126 is formed into a flat shape. Moreover, the second concave section 128 is located between the second convex section 126 and the protruding section 13 and is formed so as to recessed in the direction of withdrawing from the wall section 24.

In other words, the terminal fitting piece (first terminal fitting piece) 10 is configured by fixing the sheet metal piece 12a including the protruding section 13 and the sheet metal piece 12b including the first convex section 122 and the second convex section 126 to each other using the caulking pieces 6. The first convex section 122, the first concave section 124, the second convex section 126 and the second concave section 128 are formed inside the concave section 121 of the sheet metal piece 12a by overlapping and fixing the two sheet metal pieces 12a and 12b.

As illustrated in FIG. 3, the first convex section 122, the first concave section 124, the second convex section 126 and the second concave section 128 of the sheet metal piece 12b (the attachment section 12) are provided on each of both sides of the protruding section 13 of the sheet metal piece 12a (the attachment section 12). The first convex section 122, the first concave section 124, the second convex section 126 and the second concave section 128 provided on one side are provided so as to be bilaterally symmetrical with those provided on the other side, with the protruding section 13 serving as the center, and the first convex section 122, the first concave section 124, the second convex section 126 and the second concave section 128 are formed in this order from the outside to the center.

The protruding section 13 of the of sheet metal piece 12a (the attachment section 12) is inserted into the hole section 23 provided in the wall section 24 of the terminal fitting 22. In this case, when the wall section 24 makes contact with the flat face section 126a (the tip end face of the second convex section 126) of the second convex section 126, the terminal fitting pieces 10 and 20 are positioned along the direction in which the protruding section 13 is inserted and are overlapped with each other in the state. Furthermore, when the widthwise end section 240 of the wall section 24 makes contact with the flat face section 122a (the side end face of the first convex section 122) of the first convex section 122, the terminal fitting pieces 10 and 20 are positioned along the width direction of the protruding section 13 and are overlapped with each other in the state.

Figure 4:
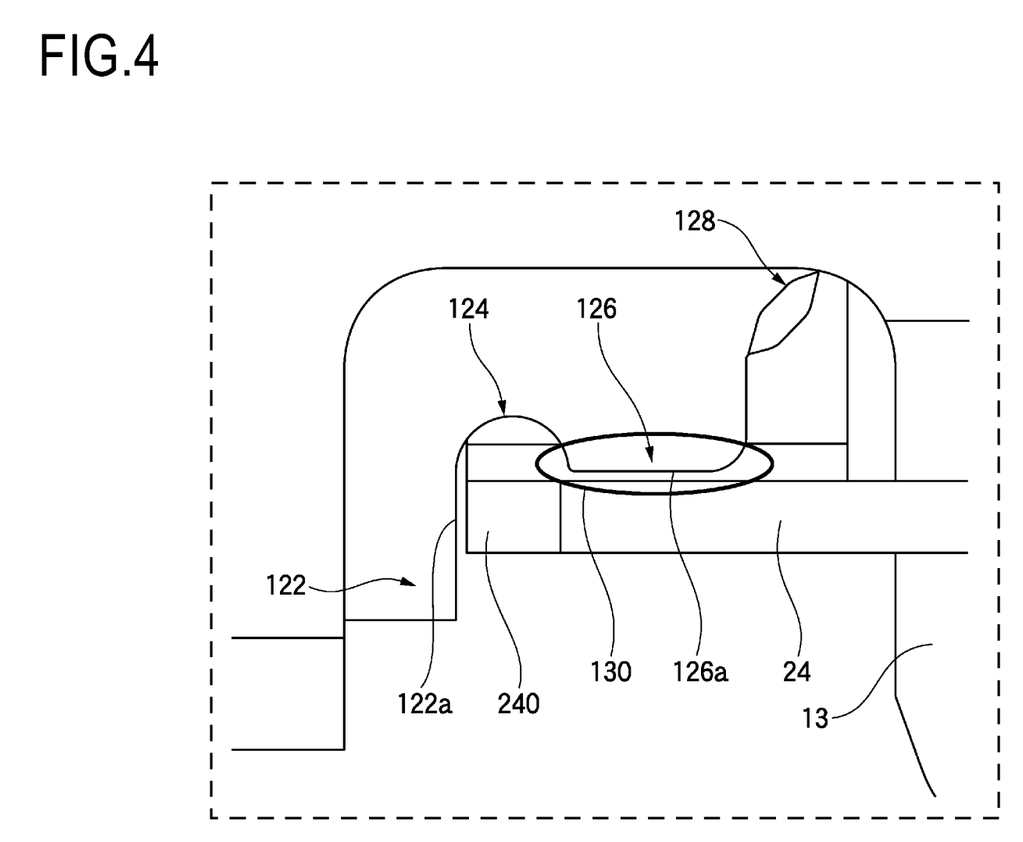
FIG. 4 is a top view illustrating the terminal fitting pieces, in which the range indicated in broken lines in FIG. 3 is further enlarged.

FIG. 4 is a top view illustrating the terminal fitting pieces in which the range indicated in broken lines in FIGS. 2(b) and 3 is further enlarged. As illustrated in FIG. 4, the terminal fitting piece (the first terminal fitting piece) 10 includes the first convex section 122 and the second convex section 126, and part (for example, the wall section 24) of the terminal fitting piece (the second terminal fitting piece) 20 can make face contact with at least one of the side end face of the first convex section 122 and the tip end face of the second convex section 126. Hence, when the terminal fitting piece (the first terminal fitting piece) 10 and the terminal fitting piece (the second terminal fitting piece) 20 are overlapped with each other, the terminal fitting piece 10 can be positioned with respect to the terminal fitting piece 20.

The hole section 23 of the terminal fitting piece (the second terminal fitting piece) 20 is provided in the wall section 24 standing upright from the attachment section 22 of the terminal fitting piece (the second terminal fitting piece) 20. The wall section 24 can make face contact with at least one of the side end face (the flat face section 122a) of the first convex section 122 and the tip end face (the flat face section 126a) of the second convex section 126. Hence, when the terminal fitting piece (the first terminal fitting piece) 10 and the terminal fitting piece (the second terminal fitting piece) 20 are overlapped with each other, the terminal fitting piece 10 can be positioned with respect to the terminal fitting piece 20.

The first convex section 122 includes the flat face section (first flat face section) 122a extending in a direction nearly perpendicular to the width direction of the wall section 24, the second convex section 126 includes the flat face section (second flat section) 126a extending in a direction nearly parallel with the width direction of the wall section 24, and at least one of the flat face section (first flat face section) 122a and the flat face section (second flat section) 126a can make face contact with the wall section 24.

As illustrated in FIGS. 3 and 4, when the protruding section 13 of the terminal fitting piece 10 is inserted into the hole section 23 of the terminal fitting piece 20, the widthwise end section 240 of the wall section 24 is positioned in the first concave section 124 (between the first convex section 122 and the second convex section 126).

The length of the first convex section 122 extended in the same direction as the protruding section 13 is longer than the length of the second convex section 126 extended in the same direction as the protruding section 13 and is also longer than the thickness of the wall section 24. The depth of the first concave section 124 recessed in the direction of withdrawing from the wall section 24 is smaller than the depth of the second concave section 128 recessed in the direction of withdrawing from the wall section 24. The first concave section 124 and the second concave section 128 are formed into rounded sections (local surface sections).

As described above, with the terminal fitting according to this embodiment, the contact face thereof is made larger by eliminating a wasteful space and by providing the convex section (the second convex section) 126, so that when the terminal fitting pieces 10 and 20 are overlapped with each other, the position of the terminal fitting 10 with respect to the terminal fitting 20 becomes stable. As a result, the terminal fitting pieces 10 and 20 overlapped with each other in this situation are improved in their stability and strength. Furthermore, as illustrated in FIG. 4, in a head region 130 in which the flat face section 126a of the convex section (the second convex section) 126 is included, the area of the face contact between the convex section (the second convex section) 126 and the wall section 24 is made larger, so that when the terminal fitting pieces 10 and 20 are overlapped with each other, the position of the terminal fitting 10 with respect to the terminal fitting 20 becomes more stable. As a result, the terminal fitting pieces 10 and 20 overlapped with each other in this situation are further improved in their stability and strength.

Since the terminal fitting pieces 10 and 20 overlapped with each other are improved in stability and strength as described above, even if the connection sections (the protruding section 13 and the hole section 23) are made small, sufficient stability and strength can be obtained.

In addition, since the wasteful space is eliminated and the side end face (the flat face section 122a) of the convex section (the first convex section) 122 makes face contact with the wall section 24, the wasteful space L illustrated in FIG. 8 can be eliminated without shortening the widthwise length of the wall section 24 to avoid point contact. Furthermore, since the wobbling of the terminal fitting piece 100 with respect to the terminal fitting piece 200 is suppressed, the terminal fitting pieces 10 and 20 overlapped with each other can be improved in their stability and strength.

Although the mode in which the two convex sections 122 and 126 are provided have been described in this embodiment, even in a mode in which either one of them is provided, the terminal fitting pieces 10 and 20 overlapped with each other can be improved in their stability and strength.

Although the embodiment according to the present invention has been described, the present invention is not limited to the embodiment, but can be changed and modified within the scope described in the appended claims.

The features of the above-mentioned embodiment of the terminal fitting according to the present invention will be briefly summarized in items [1] to [5] listed below.

[1] There is provided a terminal fitting including:
a first terminal fitting piece (10) including a first electric wire holding section (11) adapted to hold an electric wire, a first attachment section (12) to be attached to an attachment target object, and a protruding section (13) provided on the first attachment section; and
a second terminal fitting piece including a second electric wire holding section (21) adapted to hold an electric wire, a second attachment section (22) to be attached to the attachment target object, and a hole section (23) provided in the second attachment section,
wherein the first attachment section and the second attachment section are overlapped with each other in a state that the protruding section is inserted into the hole section;
wherein the first terminal fitting piece further includes a convex section (first convex section 122 or second convex section 126) extended from the first attachment section; and
wherein at least one of a side end face (flat face section 122a) and a tip end face (flat face section 126a) of the convex section is brought into face contact with a part of the second terminal fitting piece in a state that the first attachment section and the second attachment section are overlapped with each other.

[2] The terminal fitting described in item [1], wherein the convex section includes a first convex section (122) and a second convex section (126); and
wherein at least one of a side end face of a first convex section and a tip end face of the second convex section is brought into face contact with a part of the second terminal fitting piece.

[3] The terminal fitting described in item [2], wherein the hole section is provided in a wall section (24) standing upright from the second attachment section; and
wherein at least one of the side end face of the first convex section and the tip end face of the second convex section is brought into face contact with the wall section.

[4] The terminal fitting described in item [3], wherein
the first convex section includes a first flat face section (122a) extending in a direction substantially perpendicular to a width direction of the wall section;
wherein the second convex section includes a second flat face section (126a) extending in a direction substantially parallel with the width direction of the wall section; and
wherein at least one of the first flat face section and the second flat section is brought into face contact with the wall section.

[5] The terminal fitting described in item [4], wherein the first terminal fitting piece is configured by fixing a sheet metal piece (12a) including the protruding section and a sheet metal piece (12b) including the convex section to each other.

Although the present invention has been described in detail with reference to the specific embodiment, it is obvious to those skilled in the art that the present invention can be changed and modified variously without departing from the spirit and scope of the present invention.

This application is based on Japanese Patent Application (JP-2012-248874) filed on Nov. 12, 2012, the entire contents of which are hereby incorporated by reference.

INDUSTRIAL APPLICABILITY

With the terminal fitting according to the present invention, the terminal fitting pieces overlapped with each other can be improved in their stability and strength. The present invention exhibiting this effect is useful in the field of terminal fittings for attaching electric wires to attachment target objects.

DESCRIPTION OF REFERENCE NUMERALS AND SIGNS 10, 20, terminal fitting piece
11, 21 electric wire holding section
12, 22 attachment section
13 protruding section
18, 28 through hole
23 hole section
24 wall section
122 first convex section
124 first concave section
126 second convex section
128 second concave section

The invention claimed is:
1. A terminal fitting comprising:
a first terminal fitting piece comprising a first electric wire holding section configured to hold an electric wire, a first attachment section configured to be attached to an attachment target object, and a protruding section provided on the first attachment section; and
a second terminal fitting piece comprising a second electric wire holding section configured to hold an electric wire, a second attachment section configured to be attached to the attachment target object, and a hole section provided on the second attachment section,
wherein the first attachment section and the second attachment section are overlapped with each other in a state that the protruding section is inserted into the hole section;
wherein the first terminal fitting piece further comprises a first convex section and a second convex section which are extended from the first attachment section, and a first concave section and a second concave section;
wherein the first concave section is located between the first convex section and the second convex section;
wherein the second concave section is located between the second convex section and the protruding section;
wherein a tip end face of the second convex section is brought into face contact with a part of the second terminal fitting piece in a state that the first attachment section and the second attachment section are overlapped with each other; and wherein the tip end face of the second convex section extends in a direction substantially perpendicular to a protruding direction of the protruding section.

2. The terminal fitting according to claim 1, wherein a side end face of the first convex section is brought into face contact with a part of the second terminal fitting piece.

3. The terminal fitting according to claim 2, wherein the hole section is provided in a wall section standing upright from the second attachment section; and wherein the side end face of the first convex section is brought into face contact with the wall section.

4. The terminal fitting according to claim 3, wherein the first convex section comprises a first flat face section extending in a direction substantially perpendicular to a width direction of the wall section;

wherein the second convex section comprises a second flat face section extending in a direction substantially parallel with the width direction of the wall section; and wherein the first flat face section and the second flat section are brought into face contact with the wall section.

5. The terminal fitting according to claim 4, wherein the first terminal fitting piece is configured by fixing a sheet metal piece including the protruding section and a sheet metal piece comprising the convex section to each other.

6. The terminal fitting according to claim 4, wherein each of the first convex section, the first concave section, the second convex section and the second concave section are bilaterally symmetric about the protruding section.

7. The terminal fitting according to claim 4, wherein the first convex section is extended in a same direction as the protruding section and is longer than the second convex section in the same direction; and wherein the depth of the second concave section is recessed in a direction withdrawing from the wall section, in which the hole section is located, and is smaller than a depth of the first concave section in the direction withdrawing from the wall section.

* * * * *